(12) United States Patent
Griessbach et al.

(10) Patent No.: US 9,227,517 B2
(45) Date of Patent: Jan. 5, 2016

(54) CHARGING DEVICE HAVING A BIDIRECTIONAL AUXILIARY POWER SUPPLY UNIT

(71) Applicant: Bayerische Motoren Werke Aktiengesellschaft, Munich (DE)

(72) Inventors: Robert Griessbach, Weyarn (DE); Robert Wagner, Geretsried (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 198 days.

(21) Appl. No.: 14/158,408

(22) Filed: Jan. 17, 2014

(65) Prior Publication Data

US 2014/0132215 A1 May 15, 2014

Related U.S. Application Data

(63) Continuation of application No. PCT/EP2012/063996, filed on Jul. 17, 2012.

(30) Foreign Application Priority Data

Jul. 18, 2011 (DE) .......................... 10 2011 079 359

(51) Int. Cl.
*H02J 7/00* (2006.01)
*B60L 11/18* (2006.01)
*B60L 3/00* (2006.01)

(52) U.S. Cl.
CPC ........... *B60L 11/1811* (2013.01); *B60L 3/0046* (2013.01); *B60L 11/1816* (2013.01);

(Continued)

(58) Field of Classification Search
CPC ..................................................... Y02T 90/14
See application file for complete search history.

(56) References Cited

U.S. PATENT DOCUMENTS

| 5,350,994 A | 9/1994 | Kinoshita et al. |
| 2003/0029654 A1 | 2/2003 | Shimane et al. |

(Continued)

FOREIGN PATENT DOCUMENTS

| DE | 693 14 089 T2 | 5/1998 |
| DE | 102 35 489 A1 | 8/2003 |

(Continued)

OTHER PUBLICATIONS

English translation of International Preliminary Report on Patentability (PCT/IB/373) including Written Opinion (PCT/ISA/237) dated Jan. 21, 2014 (five pages).

(Continued)

*Primary Examiner* — Yalkew Fantu
(74) *Attorney, Agent, or Firm* — Crowell & Moring LLP

(57) ABSTRACT

A charging device is provided for an external alternating current voltage source and a motor vehicle equipped with a high-voltage battery, wherein the motor vehicle has a low-voltage battery, a link circuit capacitor and a charging electronics unit with a charging voltage input and a supply voltage input. The charging device is designed such that the vehicle has a bidirectional auxiliary power supply with two interfaces. The first interface of the auxiliary power supply is connected in parallel with the link circuit capacitor and in parallel with the charging voltage input of the charging electronics unit, and the second interface of the auxiliary power supply and the low-voltage battery are connected in parallel with the supply voltage input of the charging electronics unit.

9 Claims, 1 Drawing Sheet

(52) U.S. Cl.
CPC ......... *B60L11/1868* (2013.01); *B60L 2210/12* (2013.01); *B60L 2270/20* (2013.01); *Y02T 10/7005* (2013.01); *Y02T 10/7066* (2013.01); *Y02T 10/7233* (2013.01); *Y02T 90/127* (2013.01); *Y02T 90/14* (2013.01)

(56) References Cited

U.S. PATENT DOCUMENTS

| | | | |
|---|---|---|---|
| 2004/0164703 A1* | 8/2004 | Berels | B60L 11/14 320/103 |
| 2008/0316774 A1 | 12/2008 | Ito et al. | |
| 2009/0115375 A1 | 5/2009 | Iida | |
| 2010/0123989 A1 | 5/2010 | Kosaki | |
| 2010/0228413 A1* | 9/2010 | Fujitake | B60L 11/14 701/22 |
| 2011/0050173 A1* | 3/2011 | King | H02J 1/10 320/128 |
| 2013/0175990 A1* | 7/2013 | Jung | B60L 11/126 320/109 |

FOREIGN PATENT DOCUMENTS

| | | |
|---|---|---|
| DE | 10 2010 019 296 A1 | 3/2011 |
| DE | 10 2010 006 125 A1 | 8/2011 |
| EP | 2 117 106 A1 | 11/2009 |
| JP | 11-122825 A | 4/1999 |

OTHER PUBLICATIONS

German Search Report dated Apr. 3, 2012 w/ partial English translation (ten pages).
International Search Report dated Feb. 8, 2013 (three pages).

* cited by examiner

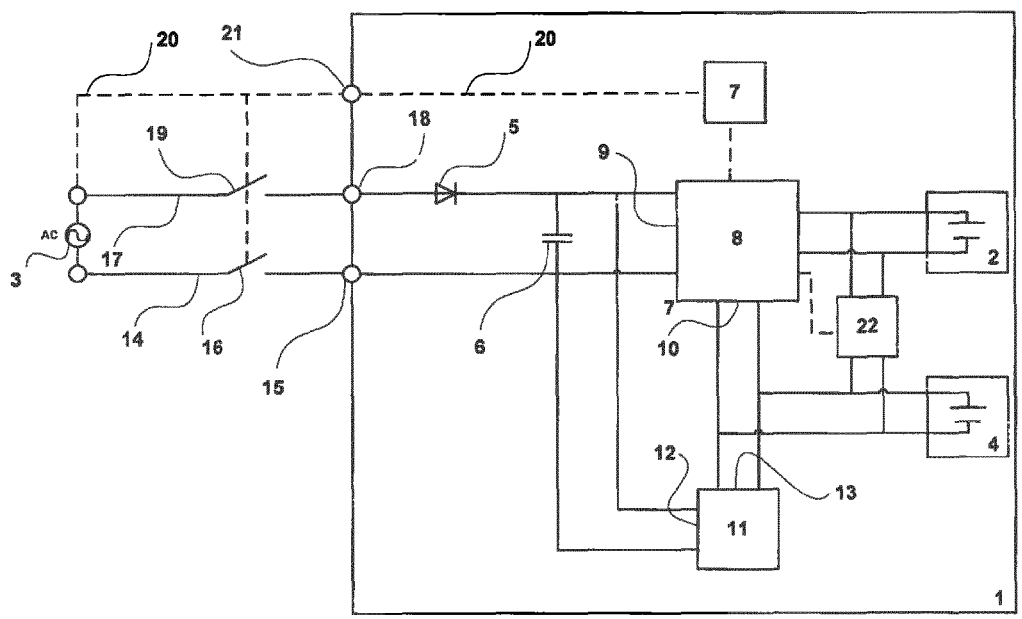

CHARGING DEVICE HAVING A BIDIRECTIONAL AUXILIARY POWER SUPPLY UNIT

CROSS REFERENCE TO RELATED APPLICATIONS

This application is a continuation of PCT International Application No. PCT/EP2012/063996, filed Jul. 17, 2012, which claims priority under 35 U.S.C. §119 from German Patent Application No. 10 2011 079 359.3, filed Jul. 18, 2011, the entire disclosures of which are herein expressly incorporated by reference.

BACKGROUND AND SUMMARY OF THE INVENTION

The invention relates to a charging device for electric vehicles comprising an external alternating voltage source and a motor vehicle with a high-voltage battery, wherein the motor vehicle has a low-voltage battery, a link circuit capacitor and a charging electronics unit with a charging voltage input and a supply voltage input.

Various demands, such as operating convenience, high user flexibility and high charging capacity, are placed on the charging device of an electric vehicle, which frequently lead to very complex and cost-intensive solutions. As a result, it is also more difficult to fulfill minimum requirements for longevity, robustness and customer availability. In this area of conflict are to be found circuits according to the prior art which are intended, for example, to limit the switch-on current, i.e. the inrush current, when a charging connection is made by plugging-in a charging cable and closing contactors. For example, the switch-on current can be limited by a resistor, which can be bypassed by switching a relay for example, after the switch-on current has occurred. On the one hand, limiting the switch-on current ensures the prescribed conformity, for example, with the CE label of safety and health-related products for guaranteeing the free movement of goods. On the other, additional losses, which mean a poorer charging efficiency when charging the electric vehicle, are associated with such a switch-on-current-limiting circuit.

An object of the invention is to provide an improved charging device for an electric vehicle.

This and other objects are achieved by a charging device comprising an external alternating current voltage source and a motor vehicle with a high-voltage battery, wherein the motor vehicle has a low-voltage battery, a link circuit capacitor and a charging electronics unit with a voltage input and a supply voltage input. The vehicle has a bidirectional auxiliary power supply with two interfaces. The first interface of the auxiliary power supply is connected in parallel with the link circuit capacitor and in parallel with the charging voltage input of the charging electronics unit. The second interface of the auxiliary power supple and the low-voltage battery are connected in parallel with the supply voltage input of the charging electronics unit.

According to the invention, the motor vehicle has a bidirectional auxiliary power supply with two interfaces. The first interface of the auxiliary power supply is connected in parallel with the link circuit capacitor and in parallel with the charging voltage input of the charging electronics unit. The second interface of the auxiliary power supply and the low-voltage battery are connected in parallel with the supply voltage input of the charging electronics unit.

The bidirectionality of the auxiliary power supply and the integration of the auxiliary power supply circuit into the charging device provides the advantage that electrical power can be transferred by way of the auxiliary power supply from the electrical path of the charging device connected to the supply voltage input of the charging electronics unit to the path connected to the charging voltage input of the charging electronics unit and vice versa.

According to a preferred embodiment of the invention, the motor vehicle has a charging control unit for charging the high-voltage battery on the external alternating voltage source, and a charging connection can be made between the motor vehicle and the external alternating voltage source. The low-voltage battery feeds the supply voltage input of the control electronics unit and ensures that the charging control unit and the auxiliary power supply receive an electrical supply via the second interface of the auxiliary power supply.

In other words, the low-voltage battery supplies the charging electronics unit and the auxiliary power supply with electricity.

It is advantageous when the auxiliary power supply charges the link circuit capacitor in order to limit a switch-on current in the control electronics unit when the charging connection is made and the link circuit capacitor is charged.

The limitation of the switch-on current by systematic charging of the link circuit capacitor enables product-specific safety standards, which may be specified as part of the CE label for example, to be maintained. As well as product safety, limiting the switch-on current also has an advantageous effect on the reliability and longevity of the charging device.

According to a further embodiment, if the low-voltage battery is defective or deeply discharged and the charging connection to charge the high-voltage battery is made, the charging control unit can be supplied with electricity from the external voltage source by way of a control cable. The auxiliary power supply can be supplied with electricity from the external alternating voltage source via the first interface of the auxiliary power supply and feeds the supply voltage input of the charging electronics unit via the second interface of the auxiliary power supply.

This ensures that the high-voltage battery of the vehicle can also be charged via the external electrical network and the charging electronics unit in the absence of an electrical power output from the low-voltage battery. Although, in the normal operating case, the charging electronics unit is supplied by the low-voltage battery, the vehicle can still be charged in the event of a breakdown due to a defective or flat low-voltage battery. In the event of a breakdown, the charging control unit and the charging electronics unit are supplied from the external electrical network. Charging of the high-voltage battery therefore does not depend on the functionality of the low-voltage battery.

In addition, a DC chopper circuit can transform the electrical voltage between the high-voltage battery and the low-voltage battery, thus enabling the low-voltage battery to be charged by way of the DC chopper.

As a result of this embodiment, the low-voltage battery can likewise be charged by the external alternating voltage source in the event of a discharge or deep-discharge. Both the high-voltage battery and the low-voltage battery can therefore be charged in the event of a defective low-voltage supply internal to the vehicle. As a result, integrating the bidirectional power supply contributes to the robustness of the charging device, as a high availability for the customer is also achieved beyond the intended range of application of the charging device. The term robustness also implies that a fault scenario which has occurred can be rectified. With the embodiment described, this is so for the case of a discharged or deep-discharged battery on account of the re-charging of the low-voltage battery.

The invention is based on the following considerations. With electric vehicles, the high-voltage battery is usually charged by means of the charging device with an on-board charger, which is connected to the alternating current (AC) voltage network (e.g. domestic supply) by means of a special, standardized interface with logic and isolating contactors. The charger is supplied with the operating voltage via the vehicle's low-voltage on-board power supply. When the isolating contactors are closed, the switch-on current in the on-board charger must be limited in order to satisfy product-specific guidelines as part of the CE label. Various circuits, which complement the isolating contactors and which require a significant technical investment and, therefore, lead to an increasing complexity of the system, are known for this purpose. Further consequences are additional electrical losses in the vehicle's charging electrics and a degradation of the efficiency for charging the high-voltage battery.

An auxiliary power supply, which charges a link circuit capacitor by way of the vehicle's low-voltage battery before the isolating contactors are closed, can be incorporated as an improving measure. By this means, the switch-on current, which can also be referred to as inrush current, is limited. The CE conformity of the charging device can be achieved in this way. A further advantage, which likewise contributes to the robustness of the charging device, results if the auxiliary power supply is designed bidirectionally and is connected to the charger. For the designated exception where the on-board charger cannot be supplied from the low-voltage battery (e.g. due to the battery being deeply discharged or defective) and the link circuit capacitor cannot be charged, the charger can be supplied by the domestic supply via the auxiliary power supply. The vehicle can therefore be charged even when the low-voltage battery is flat. Other circuits, which are required to ensure that the high-voltage storage device can be charged when the low-voltage battery is discharged, can therefore be dispensed with. A robust charging device with high availability, low susceptibility to faults, and high safety standards can therefore be implemented with a bidirectional auxiliary power supply.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram of a charging device with an auxiliary power supply according to an embodiment of the invention.

DETAILED DESCRIPTION OF THE DRAWING

FIG. 1 shows a charging device of a vehicle (1) with a high-voltage battery (2). The high-voltage battery, also referred to as high-voltage storage device, can be charged on an external alternating current (AC) voltage network (3). For charging, the vehicle has a charging electronics unit (8) with a charging voltage input (9) and a supply voltage input (10). The charging electronics unit (8) essentially consists of a DC transformer, upstream of which a rectifier (5) is connected. The charging electronics unit is monitored and controlled by a charging control unit (7). Charge management is implemented on the charging control unit in the form of software. To charge the high-voltage battery (2), a charging connection is made between the vehicle and the external alternating current voltage source. The alternating current voltage source can be designed as a single-phase network with one phase cable (17) and neutral conductor (14) or as a 3-phase network with three phase cables and neutral conductor.

The charging connection comprises a control cable (20) between the charging control unit and the alternating current voltage source for monitoring and controlling the charging process. The charging connection also provides a contactor for the phase cable or phase cables in the case of 3-phase alternating current (19) and the neutral conductor (16). By way of example, the charging connection can be made using a charging cable and a plug-and-socket connecting system (15, 18, 21).

The supply voltage input of the charging electronics unit can be fed from a 12 volt battery (4) in a 14 volt on-board sub-network of the vehicle. The low-voltage battery can be designed as a lead-acid battery. The low-voltage battery (4) also feeds a bidirectional auxiliary power supply (11) via a first interface (13) of the auxiliary power supply. The first interface is likewise connected to the supply voltage input of the charging electronics unit. The auxiliary power supply has a second interface (12) which is connected via a link circuit capacitor (6) in parallel with the supply voltage input of the charging electronics unit. The auxiliary power supply can be designed, for example, as a bidirectional DC-DC switch-mode power supply. Electrical power can be transmitted between the high-voltage battery and the low-voltage battery by way of a DC chopper circuit (22).

To charge the high-voltage battery, the charging connection is made by the vehicle user. The link circuit capacitor is charged via the low-voltage battery and the auxiliary power supply. The charge management system only enables the isolating contactors of the charging connection to be closed by way of the control cable and therefore an electrically conducting connection between the charging electronics unit and the external alternating voltage source to be made in the charged state of the link circuit capacitor. The charged link circuit capacitor effectively limits a high switch-on current flow in the charging electronics unit. This ensures that the charging device conforms to product-specific approval directives and technical norms, e.g. the CE label directives or the IEC 60555 norm.

The bidirectional design of the auxiliary power supply (11) also enables the auxiliary power supply to be supplied via the second interface. This is particularly advantageous if the high-voltage battery of the vehicle is to be charged when the low-voltage battery is discharged or defective. In this breakdown situation, which does not constitute the usual operating state of the charging device, neither the supply voltage input of the charging electronics unit is fed by the low-voltage battery, nor the link circuit capacitor is charged. On the one hand, it is true that a high switch-on current occurs if, in this special case, a charging connection is made and the isolating contactors are closed by the charge management system, which detects the missing voltage from the low-voltage battery by way of suitable sensor. However, this is tolerable due to the exceptional case outside the intended system state. On the other hand, the auxiliary power supply is fed with rectified alternating current, that is to say with substantially pulsed direct current, via the second interface. The supply voltage input of the charging electronics unit is therefore supplied with electricity via the first interface of the auxiliary power supply. Charging of the high-voltage battery is consequently also ensured in the exceptional case of a defective low-voltage battery due to the bidirectionality of the auxiliary power supply. The low-voltage battery can likewise be charged via the DC chopper between the high-voltage battery and the low-voltage battery while the high-voltage battery is charging. The cause of the exceptional case, i.e. the discharged state of the low-voltage battery, can therefore be compensated for by the charging device during a charging operation.

As well as longevity and shelf life, the charging device in FIG. 1 therefore has tremendous robustness, which ensures a high degree of reliability and customer availability of the charging device and of the vehicle. The robustness of the system enables it to be used in a customer-friendly manner even in the case of an emergency or breakdown situation. The user has to make a charging connection in the same way as with conventional charging in normal operation in order to re-establish the vehicle's readiness for operation. An additional electrical connection, for example with jump cables to a separate vehicle or some other auxiliary power supply, does not have to be made. Possible jumper cable supports or supporting terminals, including a reverse polarity protection device, such as are known to the person skilled in the art from conventional vehicles with combustion engines for carrying out a jump start, for example, can therefore be dispensed with. A cost advantage is therefore also associated with this simple architecture.

LIST OF REFERENCES

1 Vehicle
2 High-voltage battery
3 External alternating voltage source
4 Low-voltage battery
5 Rectifier
6 Link circuit capacitor
7 Charging control unit
8 Charging electronics unit
9 Charging voltage input
10 Supply voltage input
11 Bidirectional auxiliary power supply
12 Second interface
13 First interface
14 Neutral cable
15 Neutral cable connector
16 Neutral cable contactor
17 Phase cable
18 Phase cable connector
19 Phase cable contactor
20 Control cable
21 Control cable connector
22 DC chopper The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging device for use with an external alternating current voltage source that charges a high-voltage battery of a motor vehicle equipped with a low-voltage battery, a link circuit capacitor and a charging electronics unit having a charging voltage input and a supply voltage input, the charging device comprising:
a bidirectional auxiliary power supply having two interfaces, the bidirectional auxiliary power supply being configurable in the motor vehicle;
a first of the two interfaces of the auxiliary power supply being connected in parallel with the link circuit capacitor and in parallel with the charging voltage input of the charging electronics unit; and
a second of the two interfaces of the auxiliary power supply and of the low-voltage battery are connected in parallel with the supply voltage input of the charging electronics unit.

2. The charging device according to claim 1, further comprising:
a charging control unit for the motor vehicle,
wherein for charging the high-voltage battery with the external alternating current voltage source:
a charge connection is provided between the motor vehicle and the external alternating current voltage source,
the low-voltage battery feeds the supply voltage input of the charging electronics unit,
the low-voltage battery supplies the charging control unit with power, and
the low-voltage battery supplies the auxiliary power supply with power via the second interface of the auxiliary power supply.

3. The charging device according to claim 2, wherein the auxiliary power supply charges the link capacitor in order to limit a switch-on current in the charging electronics unit when the charging connection is provided and the link circuit capacitor is charged.

4. The charging device according to claim 1, wherein if the low-voltage battery is defective or deeply discharged and a charging connection is made between the vehicle and the external alternating current voltage source:
the charging control unit is supplied with power from the external alternating current voltage source via a control cable,
the auxiliary power supply is supplied with power from the external alternating current voltage source via the first interface of the auxiliary power supply, and
the auxiliary power supply feeds supply voltage input of the charging electronics unit via the second interface of the auxiliary power supply.

5. The charging device according to claim 2, wherein if the low-voltage battery is defective or deeply discharged and a charging connection is made between the vehicle and the external alternating current voltage source:
the charging control unit is supplied with power from the external alternating current voltage source via a control cable,
the auxiliary power supply is supplied with power from the external alternating current voltage source via the first interface of the auxiliary power supply, and
the auxiliary power supply feeds supply voltage input of the charging electronics unit via the second interface of the auxiliary power supply.

6. The charging device according to claim 3, wherein if the low-voltage battery is defective or deeply discharged and a charging connection is made between the vehicle and the external alternating current voltage source:
the charging control unit is supplied with power from the external alternating current voltage source via a control cable,
the auxiliary power supply is supplied with power from the external alternating current voltage source via the first interface of the auxiliary power supply, and
the auxiliary power supply feeds supply voltage input of the charging electronics unit via the second interface of the auxiliary power supply.

7. The charging device according to claim 4, further comprising:
- a DC chopper circuit operatively configured to convert electrical voltage between the high-voltage battery and the low-voltage battery, and
- wherein the low-voltage battery is charged via the DC chopper circuit.

8. The charging device according to claim 5, further comprising:
- a DC chopper circuit operatively configured to convert electrical voltage between the high-voltage battery and the low-voltage battery, and
- wherein the low-voltage battery is charged via the DC chopper circuit.

9. The charging device according to claim 6, further comprising:
- a DC chopper circuit operatively configured to convert electrical voltage between the high-voltage battery and the low-voltage battery, and
- wherein the low-voltage battery is charged via the DC chopper circuit.

\* \* \* \* \*